Oct. 18, 1955   D. B. GARDINER   2,720,755
POWER TRANSMISSION
Filed Sept. 4, 1952
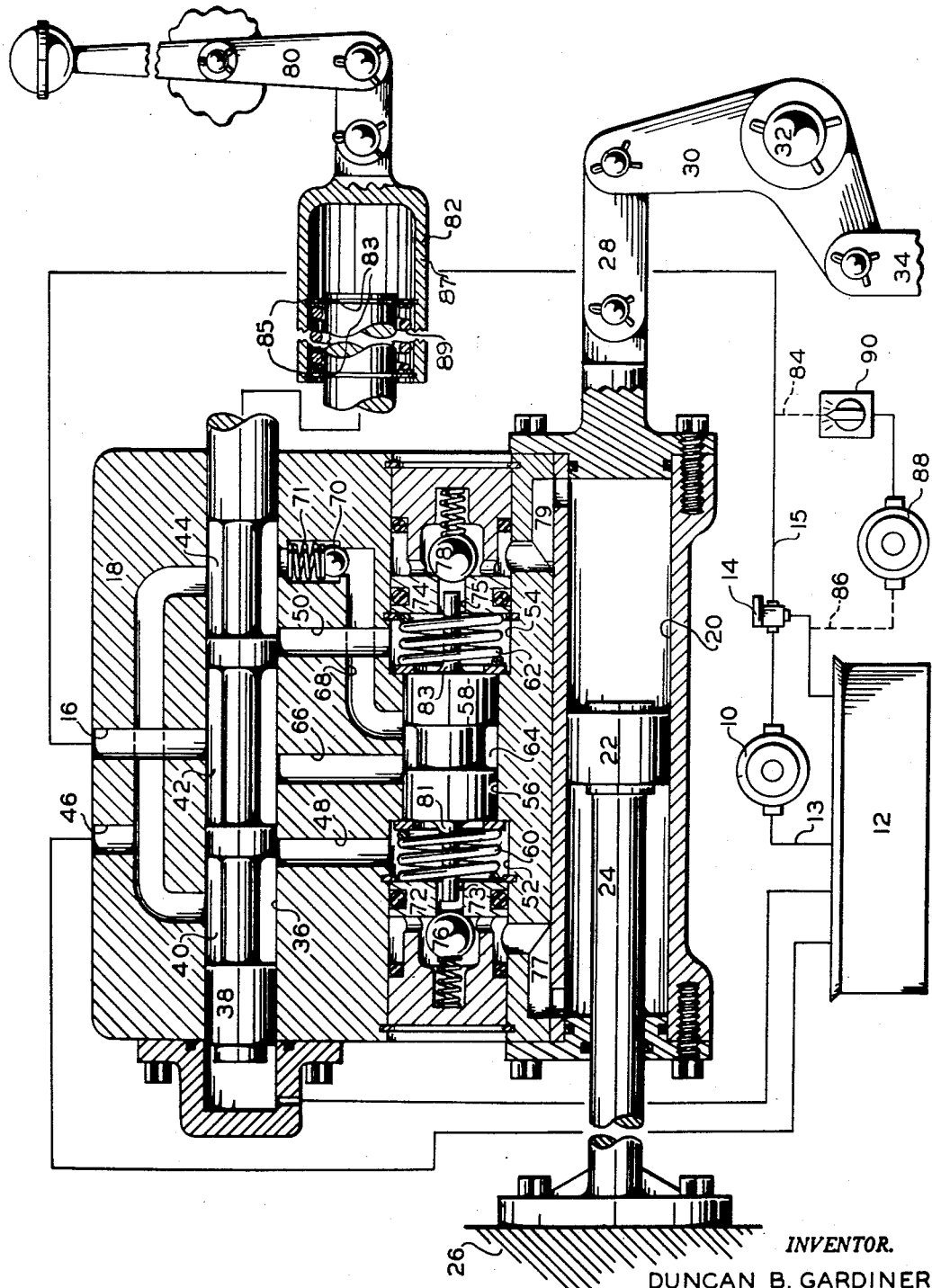
INVENTOR.
DUNCAN B. GARDINER
BY
*Ralph L. Tweedale*
ATTORNEY United States Patent Office 2,720,755
Patented Oct. 18, 1955

2,720,755

POWER TRANSMISSION

Duncan B. Gardiner, Detroit, Mich., assignor to Vickers Incorporated, Detroit, Mich., a corporation of Michigan Application September 4, 1952, Serial No. 307,891

15 Claims. (Cl. 60—52)

This invention relates to power transmissions, and is particularly applicable to those of the type comprising two or more fluid pressure energy translating devices, one of which may function as a pump and another as a fluid motor.

The invention is more particularly concerned with a control valve system for controlling a double acting fluid motor. In the mobile equipment field double acting hydraulic cylinders are extensively used in applications wherein it is necessary to lock the cylinder against movement in either direction after its initial positioning. Illustrative of such applications are cylinders utilized to position snow plow blades, road scraper blades and agricultural tractor rock shafts. When used for such purposes it is apparent that high pressure output from the pump is required only intermittently and, to prevent power loss, the pump should be unloaded except at those times.

In certain applications it may be desirable to operate a second fluid motor from the same pump that actuates the double acting cylinder. Very often in such cases the maximum pressure requirement of this second motor may be considerably less than that required to actuate the cylinder. It is then desirable that the higher pressure for operating the cylinder be instantly available at all times but that when it is not needed, pressure in the system will be maintained at the lower level required for the second motor.

Further, it is often desired that such a control valve system be suitable for use in a follow up type of system. Conventional directional valves when used in such an application have a tendency to "hang up," that is, the follow up action will cease before the valve has returned completely to the neutral position. If an open center type valve is being used, the flow through the valve may be restricted to such an extent that relatively high pressures will be retained in the system.

It is therefore an object of the present invention to provide a control valve system for use with a double acting cylinder which will positively lock the cylinder in any desired position.

It is a further object to provide such a system which is capable of maintaining relatively low pressures during the time the double acting cylinder is not being actuated.

Another object is to provide such a system which will permit operation of a second motor having considerably lower pressure requirements and to maintain in the system pressures not exceeding those lower requirements until higher pressures are needed to operate the cylinder, at which time such higher pressures are immediately available.

Still another object is to provide such a system which is particularly well suited for use in a follow up system by greatly decreasing the possibility of valve hang up due to cessation of the follow up action before the valve has fully returned to neutral.

Further objects and advantages of the present invention will be apparent from the following description, reference being had to the accompanying drawing wherein a preferred form of the present invention is clearly shown.

In the drawing:

Referring to the single schematic figure there is shown a pump 10 and a tank 12. Pump 10 is supplied with fluid from the tank 12 through a conduit 13 and delivers that fluid at an increased pressure through a relief valve 14 and a delivery conduit 15 to a fluid passage 16 in the body 18 of the control valve device. The body 18 is mounted on, so as to move with, a double acting cylinder 20. Cylinder 20 has therein a piston 22 whose rod 24 is fixed, for example, to the frame of an agricultural tractor at 26. Being thus mounted it is apparent that the application of fluid pressure to either end of the cylinder will cause axial movement of cylinder 20 of which the valve body 18 will also partake. Cylinder 20 is connected by a link 28 to one arm of a bell-crank 30 which is journalled on a trunnion 32 fixed to the tractor frame. A link 34 which may be operative to raise or lower farm implements is pin connected to the other arm of the bell-crank 30.

Valve body 18 contains a valve bore 36 having a valve spool 38 therein. Valve spool 38 has three cannelures which, with the valve bore 36, define annular fluid spaces 40, 42 and 44. The fluid supply passage 16 communicates with the intermediate annulus 42, and a fluid return passage 46 communicates with the two outer annuli 40 and 44. This communication is maintained throughout the entire path of travel of the valve spool 38.

A pair of fluid passages 48 and 50 also communicate with valve bore 36. Passages 48 and 50 intersect bore 36 in a spaced relationship such that when valve spool 38 is in the center position, as illustrated, they communicate with the return passage 46 through the annuli 40 and 44. It can be seen that shifting spool 38 to the right effects communication between the passage 50 and annulus 42 and that shifting spool 38 to the left places passage 48 in communication with annulus 42. Passages 48 and 50 communicate respectively with a pair of spring chambers 52 and 54 at opposite ends of a valve bore 56.

Bore 56 contains a valve spool 58 which is spring centered by the springs 60 and 62. Valve spool 58 has a single cannelure 64. A pair of fluid passages 66 and 68 intersect the valve bore 56 in a spaced relationship such that when the valve spool 58 is in the central position, as illustrated, the two passages are in fluid communication, but, should the valve spool 58 be shifted in either direction the passages will be isolated from each other. The passage 66 extends from valve bore 56 to intersect valve bore 36 so as to be in continuous communication with annulus 42. The passage 68 leads from the valve bore 56 to valve bore 36 intersecting bore 36 so as to be in continuous communication with the return passage 46 through annulus 44. A back pressure valve 70, biased by a spring 71, is so oriented in the passage 68 that when flow exists in passages 66 and 68, the valve 70 is operative to maintain a selected minimum pressure in them which, of course, will also be maintained in annulus 42 for a purpose hereinafter described.

Spring chambers 52 and 54 are closed at their outward ends by plugs 72 and 74, respectively. Plugs 72 and 74 each have therein axial passages 73 and 75, respectively, which are concentric with the valve bore 56 and controlled by spring biased check valves 76 and 78, respectively. Check valve 76 controls fluid communication between passage 73 and the passage 77 leading from the check valve 76 to the rod end of cylinder 20 and check valve 78 controls fluid communication between passage 75 and the passage 79 leading from the check valve 78 to the head end of cylinder 20. A pair of push rods 81 and 83 are carried at the ends of the valve spool 58 and are effective on movement of the spool to contact and open either the ball-check 76 or the ball-check 78 thus permitting movement of cylinder 20 induced by fluid supplied through the other ball-check.

The fluid path formed by passage 48, spring chamber 52, passage 73 and passage 77 may be termed an operating passage. Similarly, passage 50, spring chamber 54, passage 75 and passage 79 comprise a second operating passage.

In operation, with the pump 10 running and the valve components in the position shown, cylinder 20 will be locked in position by the check valves 76 and 78 to resist any force tending to move the implements whose position is controlled through link 34. Pump 10 will be unloaded to a pressure determined by the setting of the back pressure valve 70. It is apparent that this pressure will exist in annulus 42. Spring chambers 52 and 54 will be vented to tank through the annuli 40 and 44 respectively. Assuming now that it is desired to lower the implements controlled by link 34, the control lever 80 will be shifted so as to move directional valve spool 38 to the left. A lost motion connection 82 permits overtravel of lever 80 to permit its immediate prepositioning irrespective of the rate of travel of cylinder 20. The connection 82 comprises a first pair of spaced apart snap rings 83 on the spool 38 and an equally spaced pair of snap rings 85 in the sleeve 87. A spring 89 acts between the two pairs of snap rings to bias the sleeve and spool toward a normal position from which they are moveable by compression of the spring. Spring chamber 54 will still be vented to tank through annulus 44 but the pressure in spring chamber 52 which is now in communication with annulus 42 will tend to rise to the pressure maintained by the back pressure valve 70. This pressure is sufficient to shift valve spool 58 to the right against spring 62 thus opening the ball-check 78 and severing communication between fluid passages 66 and 68. When passages 66 and 68 are isolated from each other, pressures in the system are free to rise to the setting of the relief valve 14. Pressure in chamber 52 will open the ball-check valve 76 thus permitting fluid to flow to the rod end of the cylinder 20. Fluid in the head end of cylinder 20 is free to pass back to the reservoir 12 since ball-check 78 is mechanically held open by the valve spool 58. Cylinder 20 will thus shift to the left lowering link 34 and any implements controlled thereby. In shifting to the left, cylinder 20 will move valve body 18 to restore the illustrated positional relationship between body 18 and valve spool 38 at which time pressure in spring chamber 52 will drop, spring 62 will recenter valve spool 58 and ball-checks 76 and 78 will close thus locking cylinder 20 in position. Analogous operation results when it is desired to raise the link 34.

When used as heretofore described, the spring 71 of valve 70 would be so selected as to maintain a back pressure of a low magnitude, just sufficient to shift the valve 58. Pump 10 would thus be normally unloaded to that back pressure with consequent power savings. The invention is susceptible to wider use, however. The dotted lines, 84 and 86, indicate, respectively, the fluid inlet and outlet of an auxiliary circuit comprising a flow control valve 90 and a fluid motor 88. The auxiliary circuit illustrated is intended to be representative of various fluid operated devices which it might be desirable to operate from the same pump 10 which operates the power cylinder 20. Motor 88 could, for example, be connected to a blower or beater and require that a maximum pressure of, say, 200 p. s. i. be available, whereas operation of cylinder 20 might require perhaps 1000 p. s. i. maximum. Under such circumstances, spring 71 of valve 70 would be selected so as to maintain a back pressure of 200 p. s. i. and relief valve 14 would be set at 1000 p. s. i. During normal operation with motor 88 operating, system pressures would not exceed 200 p. s. i. and valve 70 would by-pass at that pressure the fluid pumped by pump 10 and not utilized by motor 88. Whenever cylinder 20 was brought into operation, valve 58 would isolate pump 10 from the back pressure valve 70 and pressures would be free to rise to the setting of relief valve 14. Flow control valve 90 would prevent excessive diversion of the pump output through motor 88 in response to this pressure rise in the system.

One of the outstanding features of the present invention lies in the fact that when used in a follow up application, as illustrated, the tendency of conventional follow up valves to hang up is virtually eliminated. This results from the fact that open center operation is restored by a separate spring centered valve, namely valve 58, rather than the directional valve and an immediate drop in pressure back to the setting of the back pressure valve 70 is thus insured.

It can also be seen that the present invention has provided a system for operation of two fluid motors having diverse pressure requirements wherein system pressures are normally maintained at the lower pressure but the higher pressure is instantly available when needed.

Further, low cost manufacture is made possible by utilization of the shifting of the same valve to both block the by-pass passage and unlock the double acting cylinder.

While the form of embodiment of the invention as herein disclosed constitutes a preferred form, it is to be understood that other forms might be adopted, all coming within the scope of the claims which follow.

What is claimed is as follows:

1. In a control system for a double-acting fluid motor: means forming fluid supply and return passages; means forming operating passages connected to opposite sides of said motor; check valve means in each operating passage so oriented as to block flow from said motor; a flow restricting by-pass passage between the supply and return passages; means for connecting both operating passages to the return passage or either operating passage to the supply passage and the remaining operating passage to the return passage; and shiftable valve means responsive to appreciably higher pressure in either of said operating passages to close said by-pass passage and to open the check valve in the other operating passage.

2. In a control system for a double-acting fluid motor: means forming fluid supply and return passages; means forming operating passages connected to opposite sides of said motor; check valve means in each operating passage so oriented as to block flow from said motor; a by-pass passage between said supply and return passages; back pressure maintaining means in said by-pass passage; a directional valve selectively shiftable to connect both operating passages to the return passage or either of the operating passages to the supply passage and the remaining operating passage to the return passage; and shiftable valve means responsive to appreciably higher pressure in either of said operating passages to close said by-pass passage and to open the check valve in the other operating passage.

3. In a control system for a double-acting fluid motor: means forming fluid supply and return passages; means forming operating passages connected to opposite sides of said motor; check valve means in each operating passage so oriented as to block flow from said motor; a by-pass passage between said supply and return passages; back pressure maintaining means in said by-pass passage; a directional valve selectively shiftable to connect both operating passages to the return passage or either of the operating passages to the supply passage and the remaining operating passage to the return passage; and resiliently centered valve means having an opposing pressure effective area exposed to the pressure in each operating passage and shiftable by said back pressure in either of said operating passages to block said by-pass passage and to open the check valve in the other operating passage.

4. In a control system for a double-acting fluid motor: means forming fluid supply and return passages; means forming operating passages connected to opposite sides of said motor; check valve means in each operating passage so oriented as to block flow from said motor; a by-pass passage between said supply and return passages; back pressure maintaining means in said by-pass passage; a directional valve selectively shiftable to connect both a of the operating passages to the return passage or either of the operating passages to the supply passage and the remaining operating passage to the return passage; and resiliently centered valve means having an opposing pressure effective area exposed to the pressure in each operating passage and shiftable by said back pressure in either of said operating passages to block said by-pass passage, and having mechanical means associated therewith effective upon shifting of said valve to engage and open the check valve in the other operating passage.

5. In a follow up system for a double-acting cylinder: a fixed support; a controlled member movable relative to said support by said cylinder; a pair of operating passages leading to opposite ends of said cylinder; directional valve means having an input member, shiftable relative to said support, and a restoring element, mounted so as to partake of the movement of said controlled member, said input and restoring members being relatively displaceable from a neutral position, wherein both operating passages are connected to the return passage, to connect either of said operating passages to the supply passage and the remaining operating passage to the return passage; a check valve in each operating passage so oriented as to block flow from the ends of the cylinder; a by-pass passage between the supply and return passages; back pressure maintaining means in said by-pass passage; and shiftable valve means responsive to appreciably higher pressure in either of said operating passages to close said by-pass passage and open the check valve in the other operating passage.

6. In a control valve system for operating a plurality of fluid motors from a single source of fluid pressure: means forming fluid supply and return passages; a double acting fluid motor having a pair of operating passages, one connected to each of its opposed sides; a flow restricting by-pass passage between the supply and return passages; means for connecting both operating passages to the return passage or either operating passage to the supply passage and the remaining operating passage to the return passage; shiftable valve means responsive to appreciably higher pressure in either of said operating passages to close said by-pass passage; and a second fluid motor connected to said supply passage upstream of said by-pass passage.

7. In a control valve system for operating a plurality of fluid motors from a single source of fluid pressure; means forming fluid supply and return passages; a double acting fluid motor having a pair of operating passages, one connected to each of its opposed sides; check valve means in each operating passage so oriented as to block flow from said motor; a flow restricting by-pass passage between the supply and return passages; means for connecting both operating passages to the return passage or either operating passage to the supply passage and the remaining operating passage to the return passage; shiftable valve means responsive to appreciably higher pressure in either of said operating passages to close said by-pass passage and to open the check valve in the other operating passage; and a second fluid motor connected to said supply passage upstream of said by-pass passage.

8. In a control valve system for operating a plurality of fluid motors from a single fluid pump, the combination of: a pump having an inlet and outlet; a by-pass passage interconnecting said inlet and outlet; back pressure maintaining means in the by-pass passage; a first fluid motor; an operating passage connected to said first motor; directional control valve means for selectively connecting or isolating said by-pass passage, upstream of said back pressure maintaining means, to or from, respectively, said operating passage; valve means responsive to an increase in pressure in said operating passage to block said by-pass passage; a second fluid motor; and passage means connecting said second motor to said by-pass passage upstream of said back pressure maintaining means.

9. In a control valve system for operating a plurality of fluid motors from a single fluid pump, the combination of: a pump having an inlet and outlet; a by-pass passage interconnecting said inlet and outlet; back pressure maintaining means in the by-pass passage; a first fluid motor; an operating passage connected to said first motor; directional control valve means for selectively connecting or isolating said by-pass passage, upstream of said back pressure maintaining means, to or from, respectively, said operating passage; valve means responsive to an increase in pressure in said operating passage to block said by-pass passage upstream from said back pressure maintaining means; a second fluid motor; and passage means connecting said second motor to said by-pass passage upstream of said back pressure maintaining means.

10. In a control valve system for operating a plurality of fluid motors from a single fluid pump, the combination of: a pump having an inlet and outlet; a by-pass passage interconnecting said inlet and outlet; back pressure maintaining means in the by-pass passage; a first fluid motor; an operating passage connected to said first motor; directional control valve means for selectively connecting or isolating said by-pass passage, upstream of said back pressure maintaining means, to or from, respectively, said operating passage; valve means responsive to said back pressure in said operating passage to block said by-pass passage; a second fluid motor; and passage means connecting said second motor to said by-pass passage upstream of said back pressure maintaining means.

11. In a control valve system for operating a plurality of fluid motors from a single fluid pump, the combination of: a pump having an inlet and outlet; a by-pass passage interconnecting said inlet and outlet; back pressure maintaining means in the by-pass passage; a relief valve in said by-pass passage upstream from said back pressure maintaining means, a first fluid motor; an operating passage connected to said first motor; directional control valve means for selectively connecting or isolating said by-pass passage, upstream of said back pressure maintaining means, to or from, respectively, said operating passage; valve means responsive to an increase in pressure in said operating passage to block said by-pass passage; a second fluid motor; and passage means connecting said second motor to said by-pass passage upstream of said back pressure maintaining means.

12. In a control valve system for operating a plurality of fluid motors from a single fluid pump, the combination of: a pump having an inlet and outlet; a by-pass passage interconnecting said inlet and outlet; means for maintaining a certain back pressure in the by-pass passage; a relief valve having a high setting relative to said back pressure in said by-pass passage upstream from said back pressure maintaining means; a first fluid motor; an operating passage connected to said first motor; directional control valve means for selectively connecting or isolating said by-pass passage, upstream of said back pressure maintaining means, to or from, respectively, said operating passage; valve means responsive to an increase in pressure in said operating passage to block said by-pass passage; a second fluid motor; and passage means connecting said second motor to said by pass passage upstream of said back pressure maintaining means.

13. In a control valve system for operating a plurality of fluid motors from a single fluid pump, the combination of: a pump having an inlet and outlet; a by-pass passage interconnecting said inlet and outlet; back pressure maintaining means in the by-pass passage; a double acting fluid motor having a pair of operating passages, one connected to each of its opposed sides; directional control valve means interposed between said by-pass passage, upstream of said back pressure maintaining means, and said operating passages for selectively connecting said by-pass passage to either of said operating passages; check valve means in each operating passage so oriented as to block flow from said motor; shiftable valve means responsive to appreciably higher pressure in either operating passage to close the by-pass passage and to open the check valve in the other operating passage.

14. In a control valve system for operating a plurality of fluid motors from a single source of fluid pressure; means forming fluid supply and return passages; a double acting fluid motor having a pair of operating passages, one connected to each of its opposed sides; a flow restricting by-pass passage between the supply and return passages; means for connecting both operating passages to the return passage or either operating passage to the supply passage and the remaining operating passage to the return passage; shiftable valve means responsive to appreciably higher pressure in either of said operating passages to close said by-pass passage; and a flow control valve interposed between said second motor and said supply passage.

15. In a control valve system for operating a plurality of fluid motors from a single fluid pump, the combination of: a pump having an inlet and outlet; a by-pass passage interconnecting said inlet and outlet; back pressure maintaining means in the by-pass passage; a first fluid motor; an operating passage connected to said first motor; directional control valve means for selectively connecting or isolating said by-pass passage, upstream of said back pressure maintaining means, to or from, respectively, said operating passage; valve means responsive to an increase in pressure in said operating passage to block said by-pass passage; a second fluid motor; passage means connecting said second motor to said by-pass passage upstream of said back pressure maintaining means; and flow control valve means interposed between said second motor and said by-pass passage.

References Cited in the file of this patent
UNITED STATES PATENTS

| | | |
|---|---|---|
| 651,334 | Baker | June 12, 1900 |
| 1,955,154 | Temple | Apr. 17, 1934 |
| 2,398,265 | Tyler | Apr. 9, 1946 |
| 2,550,529 | Carson | Apr. 24, 1951 |
| 2,625,168 | Charlson | Jan. 13, 1953 |